(12) United States Patent
Wickramasuriya et al.

(10) Patent No.: US 10,097,882 B2
(45) Date of Patent: Oct. 9, 2018

(54) BACK-END CONTENT ANALYSIS SYSTEM TO INITIATE SECOND-SCREEN CONFIRMATION

(71) Applicant: ARRIS Enterprises, Inc., Suwanee, GA (US)

(72) Inventors: Jehan Wickramasuriya, St. Charles, IL (US); Venugopal Vasudevan, Palatine, IL (US)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 14/824,065

(22) Filed: Aug. 11, 2015

(65) Prior Publication Data

US 2017/0048580 A1     Feb. 16, 2017

(51) Int. Cl.
| | |
|---|---|
| *H04H 60/32* | (2008.01) |
| *H04N 21/4367* | (2011.01) |
| *H04N 21/422* | (2011.01) |
| *H04N 21/44* | (2011.01) |
| *H04N 21/81* | (2011.01) |
| *H04N 21/8358* | (2011.01) |
| *H04N 21/41* | (2011.01) |
| *H04N 21/43* | (2011.01) |

(52) U.S. Cl.
CPC ..... *H04N 21/4367* (2013.01); *H04N 21/4122* (2013.01); *H04N 21/42203* (2013.01); *H04N 21/4307* (2013.01); *H04N 21/44008* (2013.01); *H04N 21/812* (2013.01); *H04N 21/8358* (2013.01)

(58) Field of Classification Search
CPC combination set(s) only.
See application file for complete search history.

(56) References Cited

U.S. PATENT DOCUMENTS

| | | | |
|---|---|---|---|
| 8,468,227 | B2 | 6/2013 | Vasudevan et al. |
| 8,484,676 | B1 | 7/2013 | Narsimhan et al. |
| 8,660,267 | B2 | 2/2014 | Oostveen et al. |
| 8,943,425 | B2 | 1/2015 | Wickramasuriya et al. |
| 8,995,822 | B2 | 3/2015 | Vasudevan et al. |

(Continued)

FOREIGN PATENT DOCUMENTS

| | | |
|---|---|---|
| WO | 2011123718 A2 | 10/2011 |
| WO | 2013032787 A1 | 3/2013 |

*Primary Examiner* — Alexander Gee
(74) *Attorney, Agent, or Firm* — Stewart M. Wiener

(57) ABSTRACT

Particular embodiments provide a hybrid approach to confirming a presence of the second-screen device in a same location as a first-screen device. In one embodiment, a trigger phase and a confirmation phase are used to confirm the presence of the second-screen device in a physical proximity to the first-screen device. The trigger phase may be performed at a back-end system. The back-end system may detect events for the content being delivered to the first-screen device using content detection techniques. The back-end system may generate a trigger event when certain conditions are met based on the detection. Once the trigger event is detected, the back-end system may confirm that the second-screen device is physically present in a same location with the first-screen device. For example, the back-end system may communicate with the second-screen device to initiate a content detection analysis on the second-screen device.

19 Claims, 6 Drawing Sheets

(56) References Cited

U.S. PATENT DOCUMENTS

| | | | |
|---|---|---|---|
| 9,106,975 B1* | 8/2015 | Gildfind | H04N 21/812 |
| 9,106,979 B2 | 8/2015 | Wickramasuriya et al. | |
| 2005/0149975 A1* | 7/2005 | Jutzi | H04L 29/06027 |
| | | | 725/95 |
| 2007/0093239 A1* | 4/2007 | Camp, Jr. | H04L 29/06027 |
| | | | 455/418 |
| 2008/0240010 A1 | 10/2008 | Vasudevan et al. | |
| 2008/0320041 A1 | 12/2008 | Engelsma et al. | |
| 2009/0150940 A1* | 6/2009 | St.John-Larkin | |
| | | | H04N 7/17318 |
| | | | 725/59 |
| 2009/0172745 A1 | 7/2009 | Horozov et al. | |
| 2009/0241155 A1 | 9/2009 | Narasimhan et al. | |
| 2009/0288120 A1* | 11/2009 | Vasudevan | H04N 7/17318 |
| | | | 725/58 |
| 2010/0115596 A1 | 5/2010 | Horozov et al. | |
| 2010/0121763 A1 | 5/2010 | Vasudevan et al. | |
| 2010/0269128 A1* | 10/2010 | Gordon | H04N 7/17318 |
| | | | 725/25 |
| 2010/0293032 A1 | 11/2010 | Engelsma et al. | |
| 2012/0116869 A1 | 5/2012 | Vasudevan et al. | |
| 2013/0031581 A1 | 1/2013 | Narasimhan et al. | |
| 2013/0036011 A1* | 2/2013 | Roberts | G06Q 30/0251 |
| | | | 705/14.58 |
| 2013/0132998 A1 | 5/2013 | Narasimhan et al. | |
| 2013/0144709 A1 | 6/2013 | Narasimhan et al. | |
| 2013/0159876 A1 | 6/2013 | Narasimhan et al. | |
| 2013/0160036 A1 | 6/2013 | Narasimhan et al. | |
| 2013/0194310 A1 | 8/2013 | Vasudevan et al. | |
| 2013/0243392 A1 | 9/2013 | Vasudevan et al. | |
| 2013/0246168 A1 | 9/2013 | Wickramasuriya et al. | |
| 2013/0246447 A1 | 9/2013 | Wickramasuriya et al. | |
| 2014/0051505 A1 | 2/2014 | Wickramasuriya et al. | |
| 2014/0074923 A1 | 3/2014 | Vasudevan et al. | |
| 2014/0089967 A1 | 3/2014 | Mandalia et al. | |
| 2014/0143043 A1 | 5/2014 | Wickramasuriya et al. | |
| 2014/0143803 A1 | 5/2014 | Narsimhan et al. | |
| 2014/0282642 A1 | 9/2014 | Needham et al. | |
| 2015/0073921 A1 | 3/2015 | Vasudevan et al. | |
| 2015/0073924 A1 | 3/2015 | Wickramasuriya et al. | |
| 2015/0142557 A1* | 5/2015 | Krishnamurthy | G06Q 30/0241 |
| | | | 705/14.45 |
| 2015/0149922 A1 | 5/2015 | Wickramasuriya et al. | |
| 2015/0331954 A1 | 11/2015 | Wickramasuriya et al. | |

* cited by examiner

BACK-END CONTENT ANALYSIS SYSTEM TO INITIATE SECOND-SCREEN CONFIRMATION

BACKGROUND

Multi-screen usage during television consumption has become more popular. These solutions display second-screen content on second-screen devices while a user watches first-screen content (e.g., a television show) on a first-screen device (e.g., television). The second-screen provide complementary content that may depend on synchronization mechanisms to synchronize the second-screen content on the second-screen device with activity (e.g., intra-program content) that is occurring on the first-screen device. For example, when a user is watching a television show on the first-screen device, an advertisement on the second-screen device that is related to specific content of the television show is displayed at an appropriate time.

Before sending the advertisement to the second-screen device, a content source must detect the intra-program content has or will occur. In a cable network system, the cable delivery company is typically different from the content source. Thus, the content sources typically do not have access to the cable delivery company's network. In this case, the content source may use an over the top (OTT) solution to synchronize the intra-program content with the second-screen content. For example, the content source uses the second-screen device to detect the content being output on the first-screen device.

One solution to detect what content is being output by the first-screen device may be to use audio fingerprinting solutions. In this case, the second-screen device starts the process by performing the audio fingerprinting. For example, the second-screen device may run an application that is always on and using the microphone to detect audio in the location of the second-screen device. Then, the second-screen device may perform audio fingerprinting to detect the content in the location. The detected fingerprints then need to be compared with an index of fingerprints to identify the content or a time within the content. This may involve using an over the top network to connect to a server to perform the comparison, or the client may perform the comparison. This solution may use a lot of the processing power and battery life of the second-screen device, which may not be desirable. Further, privacy concerns may exist if the microphone of the second-screen device is always accessed.

DETAILED DESCRIPTION

Figure 1:
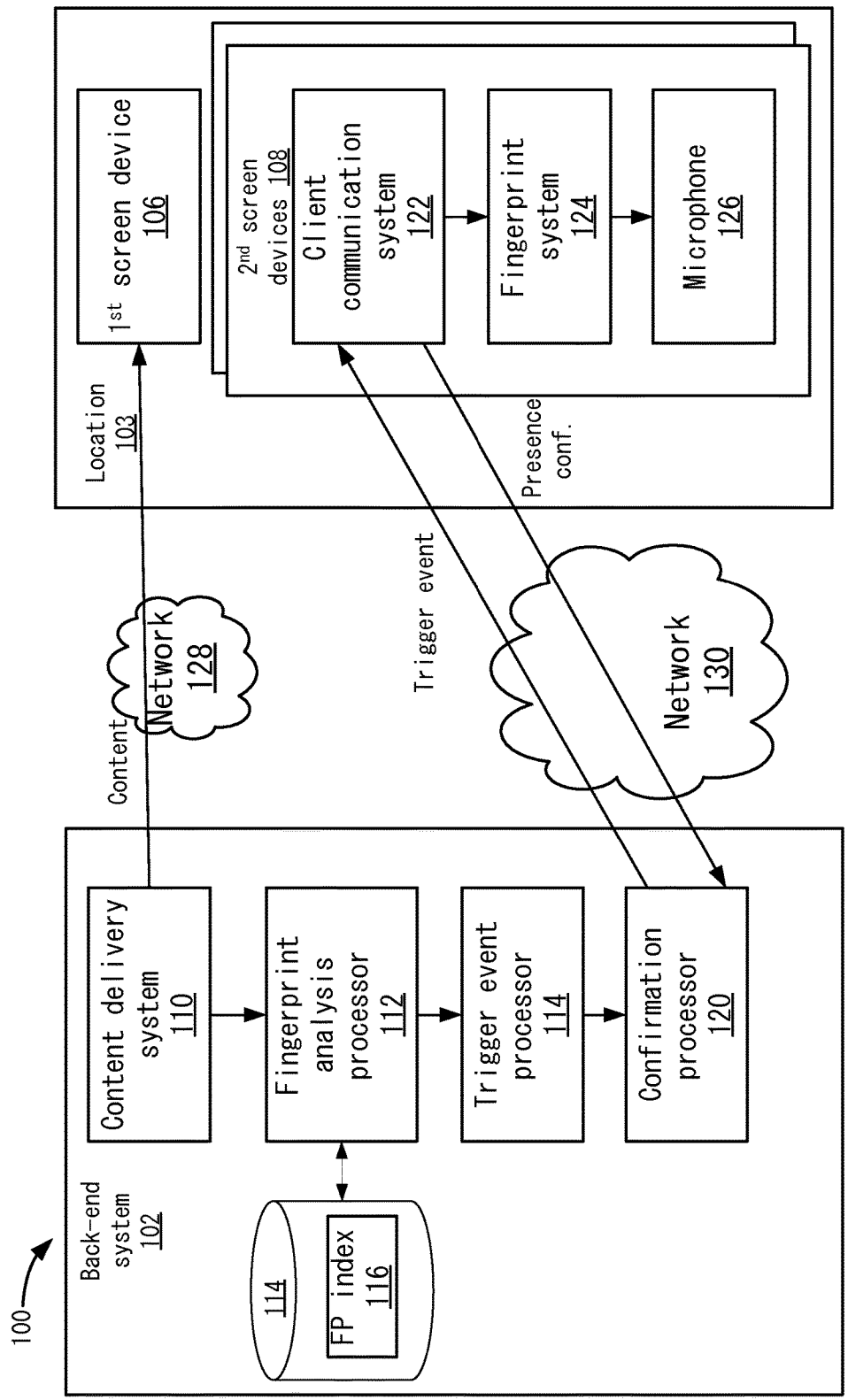
FIG. 1 depicts a system for confirming presence according to one embodiment.

Described herein are techniques for a second-screen device presence confirmation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a hybrid approach to confirming a presence of the second-screen device in a same location as a first-screen device. In one embodiment, a trigger phase and a confirmation phase are used to confirm the presence of the second-screen device in a physical proximity to the first-screen device. The trigger phase may be performed at a back-end system, such as at a server (or servers) that is remotely located and separate from both the first-screen device and the second-screen device. The back-end system may detect events for the content being delivered to the first-screen device using content detection techniques, including audio detection, video detection, metadata detection, watermarking, or other technologies to detect the content being delivered. The back-end system may generate a trigger event when certain conditions are met based on the detection. For example, when a certain activity is output on the first-screen device, the back-end system may use audio fingerprinting to detect the activity that is being output on the first-screen device.

Once the trigger event is detected, the back-end system may confirm that the second-screen device is physically present in a same location with the first-screen device. For example, the back-end system may communicate with the second-screen device to initiate an action on the second-screen device. In one embodiment, the action may be a content detection analysis, such as an audio fingerprint or a video fingerprint. For example, the second-screen device may be triggered to perform an audio fingerprint using its microphone to detect audio around the second-screen device. If the second-screen device is within a microphone capture range of the first-screen device such that the microphone can detect the audio of the first-screen device, then the audio fingerprint may be used to confirm the content being output by the first-screen device. In this case, the second-screen device is triggered only to perform the confirmation of presence when the back-end system detects the trigger event. Thus, the second-screen device does not need to access the microphone continuously, which saves power and also alleviates privacy concerns. The trigger event from the back-end system may also initiate other actions on the second-screen device, such as displaying second-screen content including a synchronized advertisement (ad) or other secondary content.

Upon the second-screen device performing the content detection analysis, a feedback loop may be created between the second-screen device and the back-end system. For example, the second-screen device may send the confirmation of presence to the back-end system. The back-end system may then perform an action based on the confirmed presence. For example, the back-end system may trigger advertisements to be sent to the second-screen device, set prices for advertisement sales to advertisers based on the confirmed second-screen device's presence, or other actions that will be described in more detail below.

System Overview

FIG. 1 depicts a system 100 for confirming presence according to one embodiment. System 100 includes a back-end system 102 and client-side devices in a location 103. The client-side devices may include a first-screen (1$^{st}$ screen) device 106 and a set of second-screen (2$^{nd}$ screen) devices 108. As is known, a household may include multiple users that may be using the first-screen device 106 and second-screen devices 108 in a same location 103, such as a house, business, building, etc. It will be understood that back-end system 102 may be coupled to multiple locations for different households. In one embodiment, back-end system 102 may perform personalized processing for each household.

The first-screen device 106 may be include a primary screen, such as a television, that a user is primarily watching. For example, a user may watch a television show on first-screen device 106. Second-screen devices 108 may include secondary screens in which supplemental or second-screen content can be viewed while a user is watching first-screen device 106. Examples of second-screen devices 108 include mobile devices, such as smartphones, tablets, and laptop computers. Different users in the household may be using different second-screen devices 108.

A content delivery system 110 may deliver content to first-screen device 106. In one embodiment, content delivery system 110 may be a cable television network 128. Also, first-screen device 106 may use a set top box (not shown) to tune to different channels of the cable television network 128. In response, content delivery system 110 may deliver content for the channels to first-screen device 106. Different communication protocols schemes may be used, such as quadrature amplitude modulation (QAM) or Internet Protocol (IP), to deliver the content stream. Second-screen devices 108 communicate with back-end system 102 using an over-the-top (OTT) system that may deliver content using an OTT network 130, such as the Internet or the cloud. OTT network 130 may deliver content via a different protocol from the cable network 128, or via different network components. Also, OTT network 130 may be part of the same network as cable network 128. Although these two types of networks are described, it will be understood that the same network or other types of networks may be used.

In one embodiment, back-end system 102 is integrated with content delivery system 110. For example, back-end system 102 is part of cable television network 128 that delivers video content for different television stations. Different cable network operators may own different cable networks. The cable network operators may be different companies from content sources that develop the content. To perform the presence confirmation discussed below, integrating back-end system 102 with the content delivery systems 110 improves the operation of second-screen devices 108 by using resources of back-end system 102 to trigger events rather than having second-screen devices 108 trigger the events. In one embodiment, the network operators may operate back-end system 102, and not the content sources/owners. As will be discussed later, back-end system 102 may offer second-screen opportunities to other entities, such as advertisers, content sources, etc.

Back-end system 102 is configured to perform a trigger phase and confirmation phase. The trigger phase may analyze content being delivered to first-screen device 106 continuously. Once back-end system 102 determines that a trigger event has occurred, then the confirmation phase may confirm the presence of second-screen device 108 with respect to first-screen device 106. Also, back-end system 102 may analyze applicable to recorded content (e.g., digital video recorder (DVR) content) as well as live content. If back-end system 102 searches past broadcasts, back-end system 102 can confirm presence when DVR content is watched.

To perform the trigger phase, a back-end fingerprint analysis processor 112 in back-end system 102 may be integrated with content delivery system 110. For example, back-end fingerprint analysis processor 112 may include multiple computers, such as servers in a data center or server farm, that can tune to the same channels that first-screen device 106 is requesting. In one example, content delivery system 110 may include multiple communication channels that deliver content to first-screen devices 106. Back-end fingerprint analysis processor 112 may analyze content from all the channels. In one embodiment, back-end fingerprint analysis processor 112 may receive an indication as to which channel first-screen device 106 is receiving content. Then, back-end fingerprint analysis processor 112 may tune to that channel to perform a fingerprint analysis on content for that channel. In another embodiment, back-end fingerprint analysis processor 112 may include tuners that tune to all television channels that have specific content being delivered and perform a fingerprint analysis on all the channels. Once back-end fingerprint analysis processor 112 knows which content is being delivered to first-screen device 106, back-end fingerprint analysis processor 112 uses that fingerprint analysis. In other embodiments, back-end fingerprint analysis processor 112 may use different techniques to request the content being delivered to first-screen device 106, such as intercepting content being delivered to first-screen device 106 or requesting the content on demand via an OTT network. Also, back-end fingerprint analysis processor 112 may use other external data other than using the actual content (e.g., ad placement information, electronic program guide (EPG) data) to infer media time (or windows) of interest, or use watermarking in the content or other technologies to detect intra-program media times of interest.

Because back-end fingerprint analysis processor 112 is situated in back-end system 102, the fingerprint analysis may be performed continuously. That is, the computing resources of back-end system 102 may be much greater than the computing resources of any devices on client-side 104 and thus do not affect the delivery of content to first-screen device 106. Also, the fingerprint analysis performed in back-end system 102 does not affect the performance of any devices on client-side 104 as resources of second-screen devices 108 are not used in the trigger phase.

Back-end fingerprint analysis processor 112 may perform different content detection analyses. A fingerprint is discussed, but other detection methods may be used. In one embodiment, back-end fingerprint analysis processor 112 may perform an audio fingerprint of the content for a channel being used to send content to first-screen device 106. The audio fingerprint may be used to identify the content being requested, or certain events in the content. For example, the audio fingerprint may be able to identify the television show being broadcast to first-screen device 106. Further, the audio fingerprint may be used to identify specific events in the content, such as specific times of interest including character lines or references. For example, the audio fingerprint may be used to determine a specific character is speaking in the content, determine a specific event that occurred in the content, or any other content-related event.

In one embodiment, back-end fingerprint analysis processor 112 may use a fingerprint (FP) index 116 stored in storage 114 to detect events of interest in the content. For example, back-end fingerprint analysis processor 112 may compare multiple audio fingerprints of certain ranges of audio (e.g., a sliding range of 5 seconds of audio) determined from the content to fingerprints in FP index 116.

When a match occurs between a detected audio fingerprint in the content being delivered and a fingerprint in the FP index 116, then back-end fingerprint analysis processor 112 may determine a trigger event has occurred.

Once the trigger event is determined, the confirmation process is performed. In one embodiment, a trigger event processor 118 determines a second-screen device 108 in which to send the trigger event. For example, trigger event processor 118 determines a user (or users) associated with first-screen device 106, such as the household associated with first-screen device 106 may include a number of users. Trigger event processor 118 determines a second-screen device 108 (or multiple second-screen devices 108) associated with the household. Only one second-screen device 108 may be discussed, but it will be understood that trigger event processor 118 may confirm presence with multiple second-screen devices 108 simultaneously.

Once selecting one of the second-screen devices 108, back-end system 102 then needs to confirm the presence of that second-screen device 108 with respect to first-screen device 106. In other embodiments, back-end system 102 may confirm the presence of all (or a subset) of second-screen devices 108 associated with the household. The confirmation of presence may be defined based on detection methods in second-screen device 108. For example, it may be a goal to determine that second-screen device 108 is physically present in a same location as first-screen device 106. If a microphone of second-screen device 108 is used, then second-screen device 108 must be physically within a range such that the microphone can detect audio from first-screen device 106. Other methods may also be used to confirm presence, such as taking video of the content being output by first-screen device 106.

Trigger event processor 118 may generate the appropriate trigger event to send to the determined second-screen device 108 to confirm presence. Different trigger events may initiate actions on second-screen device 108. One trigger event may initiate a content detection analysis on second-screen device 108 as discussed above. Another trigger event action may include displaying second-screen content on second-screen device 108 once presence is confirmed.

A confirmation processor 120 then communicates with second-screen device 108 to confirm the presence of second-screen device 108 as being in a same physical location as first-screen device 106. In this case, confirmation processor 120 may push the trigger event to a client communication system 122. This push is triggered by back-end system 102 and not second-screen device 108. That is, resources on second-screen device 108 were not used to generate the trigger event or cause the push of the trigger event.

Once receiving the trigger event, client communication system 122 may initiate the presence confirmation process. In one embodiment, client communication system 122 may be located at the operating system level such that an application may not need to be opened in order to process the trigger event. In other embodiments, client communication system 122 may be included in an application running on second-screen device 108. In one embodiment, client communication system 122 initiates the presence confirmation process only when the trigger event is received. That is, the presence confirmation process is not running when the trigger event is first received by client communication system 122. This ensures that excess power and computing resources on first-screen device 106 are not being used and also that privacy concerns may be alleviated because microphone 126 is not always accessed.

A client fingerprint system 124 may then perform the presence confirmation according to the trigger event. For example, the trigger event may specify what action second-screen device 108 should be performed. In one embodiment, an audio fingerprint confirmation is requested, and the trigger event includes one or more audio fingerprints that identify the content being output on first-screen device 106. Then, second-screen device 108 detects and analyzes audio detected within range of a microphone 126 of second-screen device 108. Then, audio detected by microphone 126 is analyzed to identify content within the range of microphone 126. For example, if second-screen device 108 is in the range of first-screen device 106 such that audio from first-screen device 106 can be detected by microphone 126, then client fingerprint system 124 may perform an audio fingerprint of that audio. In this way, client fingerprint system 124 may confirm that a user is watching the content being output on first-screen device 106. Because back-end system 102 has detected a trigger event, the client side analysis may be more focused than if the client side had initiated the analysis. For example, if it is known that a certain show is being sent to first-screen device 106, then the trigger event may be looking to confirm certain content in that show that it knows will be output on first-screen device 106. This makes the fingerprint analysis in second-screen device 108 much improved and faster. In the background, the second-screen device had to determine the content of the first-screen device, which required searching against a large number of shows. Instead of matching a detected audio fingerprint against a database of fingerprints for many shows, particular embodiments may be only looking to detect a very small number of fingerprints for a single show within a small time range. This uses significantly less resources of second-screen device 108.

If it is confirmed that second-screen device 108 is in the same location as first-screen device 106, client communication system 122 may send a presence confirmation (presence conf.) back to confirmation processor 120 of back-end system 102. This forms a feedback loop between second-screen device 108 and back-end system 102. Confirmation processor 120 may then initiate dynamic actions based on the confirmation of presence, such as the dynamic provisioning of second-screen content based on the presence, the sending of ads to second-screen device 108, the bidding on advertisements for second-screen device 108, and other actions that will be described in more detail below.

Trigger Event Generation in Back-End System 102

Figure 2:
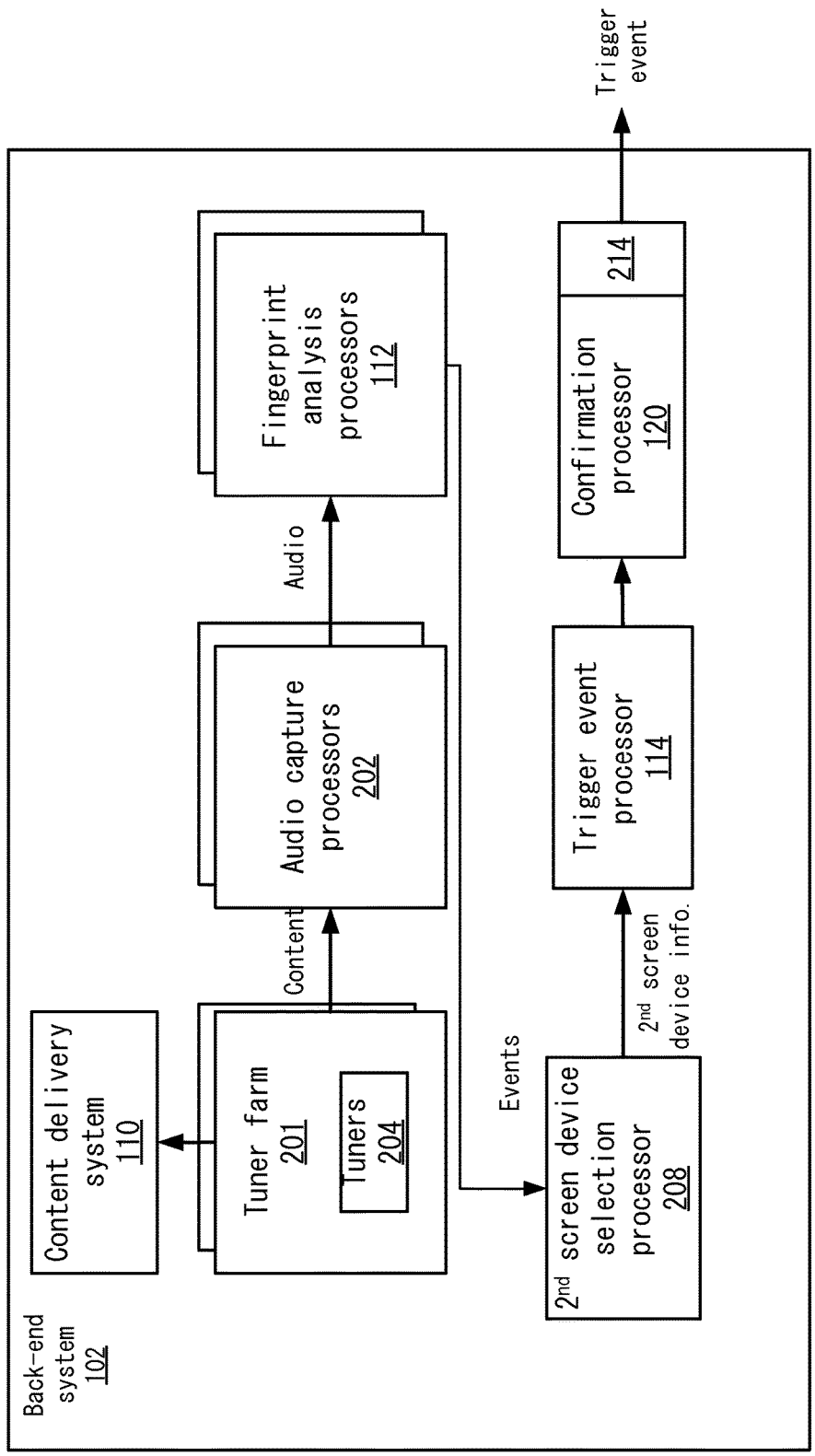
FIG. 2 depicts a more detailed example of a back-end system according to one embodiment.

The trigger event generation process in back-end system 102 will now be described in more detail. FIG. 2 depicts a more detailed example of back-end system 102 according to one embodiment. This embodiment is described with respect to audio fingerprints, but other information or methods may be used as was described above. Back-end fingerprint analysis processor 112 may be implemented by a tuner server farm 201, which includes multiple channel tuners 204 that can tune to multiple different channels of content delivery system 110. In a cable network, content is delivered on channels. Tuners 204 tune to the channels and receive the content being broadcast at that time to first-screen devices 106. Tuners 204 may also tune to on-demand channels, or capture video through other methods.

Multiple audio capture processors 202 that can capture audio from the channels and perform the fingerprinting of the audio. In this embodiment, all audio from all of the television channels may be fingerprinted continuously. Then, when a user tunes to a television channel, back-end system 102 can then use one of the fingerprint analyses for that channel. In another embodiment, fingerprints for all of the channels may not be performed continuously. Rather, a channel tuner 204 may tune to a same channel as that being used to send content to first-screen device 106. For example, audio capture processor 202 may detect which channel is requested by first-screen device 106. For example, control signals from first-screen device 106 are intercepted by virtue of back-end system 102 being integrated with content delivery system 110. Then, audio capture processor 202 uses channel tuner 204 to tune to that same channel to receive the audio from content delivery system 110 for that channel. The fingerprint detection may also be performed before the scheduled broadcast. In non-cable networks, tuners 204 may request or intercept content, or retrieve content in many different ways.

Audio capture processors 202 may then forward the fingerprints to fingerprint analysis processors 112. As discussed above, fingerprint analysis processors 112 may analyze the fingerprint of the audio. For example, the detected fingerprints are compared to fingerprints in FP index 116. The fingerprints in FP index 116 may correspond to events of interest in multiple instances of different content. This fingerprint analysis may be performed continuously. This is because back-end system 102 includes enough computing resources to perform the fingerprint analysis effectively and also does not affect the performance on client-side 104.

Once the match of a fingerprint is determined, a second-screen device selection processor 208 is used to select second-screen device 108. For example, second-screen device selection processor 208 may access a user account to determine an entity, such as a user or household associated with first-screen device 106. Once the entity is determined, second-screen devices 108 associated with the entity are determined. Then, in this case, for discussion purposes, only a single second-screen device 108 is selected, but multiple second-screen devices 108 may be selected. Also, wherein multiple first screen devices 106 exist in a location, the presence confirmation may be used to identify which users are in front of which first screen devices 106. Further, certain restrictions on whether a fingerprint can be imposed, such as by location or time. That is, the fingerprint process is restricted in the bedroom or at night. Once determining second-screen device 108, second-screen device selection processor 208 determines how to communicate with second-screen device 108. For example, communication with second-screen device 108 should be enabled without the user having to log into an application.

Trigger event processor 114 then generates a trigger event for second-screen device 108. The trigger event is designed to be pushed to second-screen device 108 and cause second-screen device 108 to perform certain actions. In one example, the trigger event may include parameters or code that can be executed by second-screen device 108. Confirmation processor 120 can then send the trigger event to second-screen device 108. In one embodiment, confirmation processor includes an interface 214 to network 130 to connect to second-screen device 108. Interface 214 may be configured such that back-end system 102 can push events to second-screen devices 108. In one embodiment, network 130 may be different from the network 128 that is used to send the content to first-screen device 106. In other embodiments, the networks may be the same.

Trigger Event Processing by Second-Screen Device 108

Figure 3:
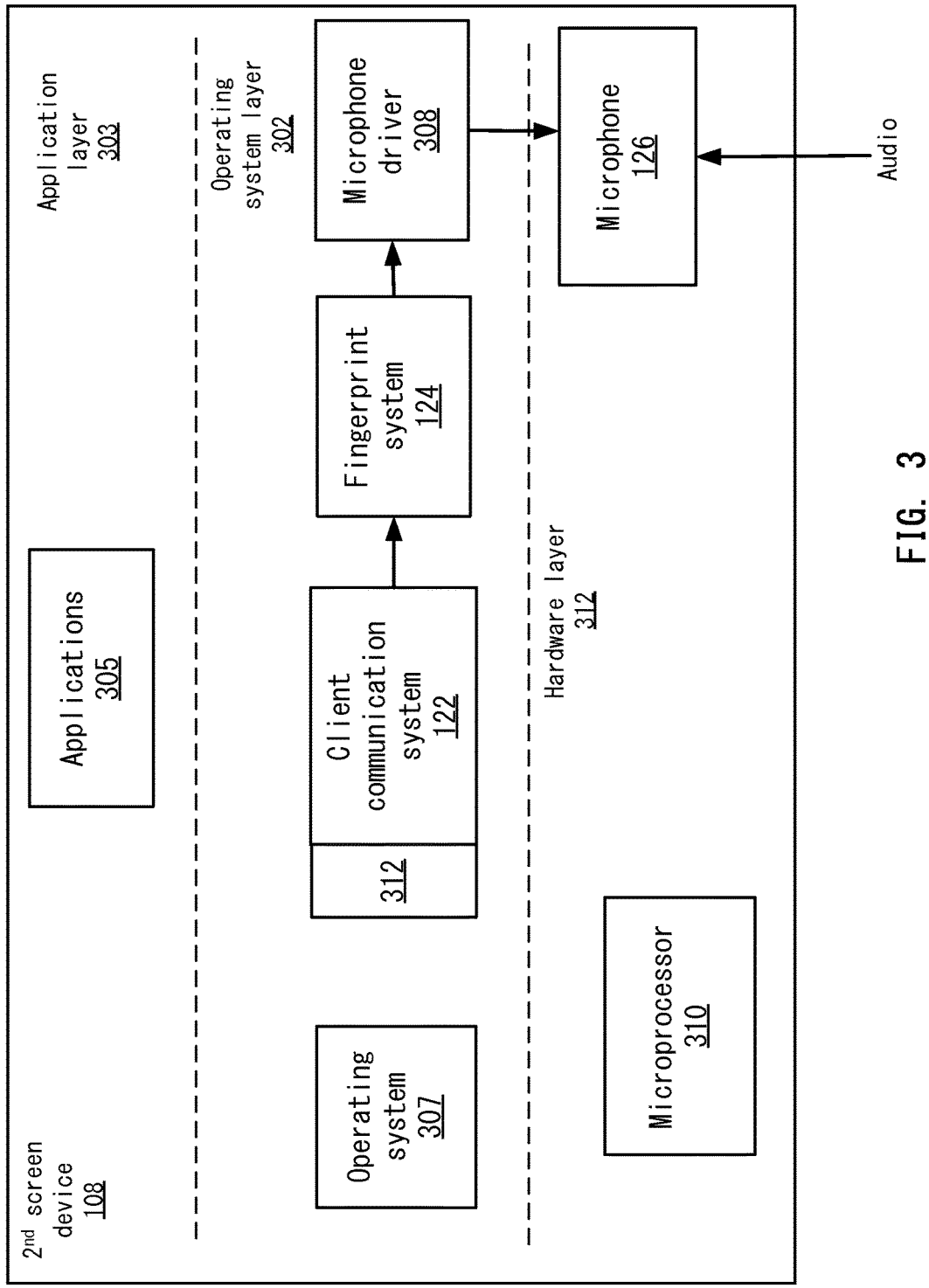
FIG. 3 depicts a more detailed example of a second-screen device according to one embodiment.

Second-screen device 108 processes the trigger event upon receiving it. FIG. 3 depicts a more detailed example of second-screen device 108 according to one embodiment. Second-screen device 108 includes an operating system layer 302, an application layer 303, and a hardware layer 312. Operating system layer 302 executes an operating system 307 of second-screen device 108. Application layer 303 runs applications 305 on top of an operating system 307. Also, a microprocessor 310 executes operating system 307 and applications 305 as is known. Although this architecture is described, other architectures may be used, such as an application 305 may process the trigger events.

In one embodiment, the trigger event processing may be performed at the operating system layer 302 so that the user does not need to log into an application 305 to have the trigger event processing performed. In other embodiments, the other may have an application 305 running in the background or be actively using an application 305 that can process the events. Including the trigger event processing at the operating system layer 302 allows the trigger events to be efficiently processed without the need for other application-layer services. Also, this provides the benefit of trigger event processing at an application programming interface (API) level rather than having to replicate the service in multiple applications in application layer 303.

Client communication system 122 is configured to receive the trigger event. Client communication system 122 may include an interface 312 that is used to receive the trigger event from back-end system 102. Interface 312 is configured to receive push events from back-end system 102. Once receiving the trigger event, client communication system 122 may determine an action to perform. For example, the trigger event may specify certain actions to perform. In one example, the presence of second-screen device 108 may be confirmed based on the trigger event. In other examples, second-screen content, such as ads, may be received and displayed.

Second-screen device 108 may confirm the presence based on different methods. In one embodiment, an audio detection process is started (it was not being performed before receiving the trigger event). In this case, client fingerprint system 124 may perform an audio fingerprint of content within the range of a microphone 126 of second-screen device 108. To access microphone 126, client fingerprint system 124 may use a microphone driver 308 in operating system layer 302. Through microphone driver 308, client fingerprint system 124 may activate microphone 126 to detect audio. It should be noted that before receiving the trigger event, microphone 126 was not being accessed by client fingerprint system 124 to perform an audio fingerprint. Rather, upon receiving the trigger event, client fingerprint system 124 dynamically activates microphone 126 to perform the audio fingerprint.

Microphone 126 may then be used to detect audio within a certain range of microphone 126. For example, any audio being output in the future in a same location as second-screen device 108 may be detected. If second-screen device 108 is in the same location as first-screen device 106, then microphone 126 may be able to detect audio from first-screen device 106.

Client fingerprint system 124 may then perform a fingerprint of the detected audio. If a fingerprint matches a parameter in the trigger event, then client fingerprint system 124 may confirm the presence of second-screen device 108 in the same location as first-screen device 106. For example, the trigger event may specify a fingerprint of content that is output or going to be output on first-screen device 106. The fingerprint analysis on second-screen device 108 may be simplified or less computationally extension than the fingerprinting performed by back-end system 102. This is because back-end system 102 knows what second-screen device 108 should look for. This is different from doing a blind fingerprint for any type of content. Also, second-screen device 108 is looking to confirm the presence and not exactly looking to discover what the user is watching so this analysis may be easier to identifying the exact content the user is watching. Thus you could optimize the matching process on the backend thus reducing the time to match a fingerprint from the client. [If that content is detected by the matching of fingerprints, then client fingerprint system 124 can determine that second-screen device 108 is in the same location as first-screen device 106 by virtue of detecting the output of content on first-screen device 106.

Once the presence is confirmed, client communication system 122 may send the confirmation of presence back to back-end system 102.

Confirmation Processing

Figure 4:
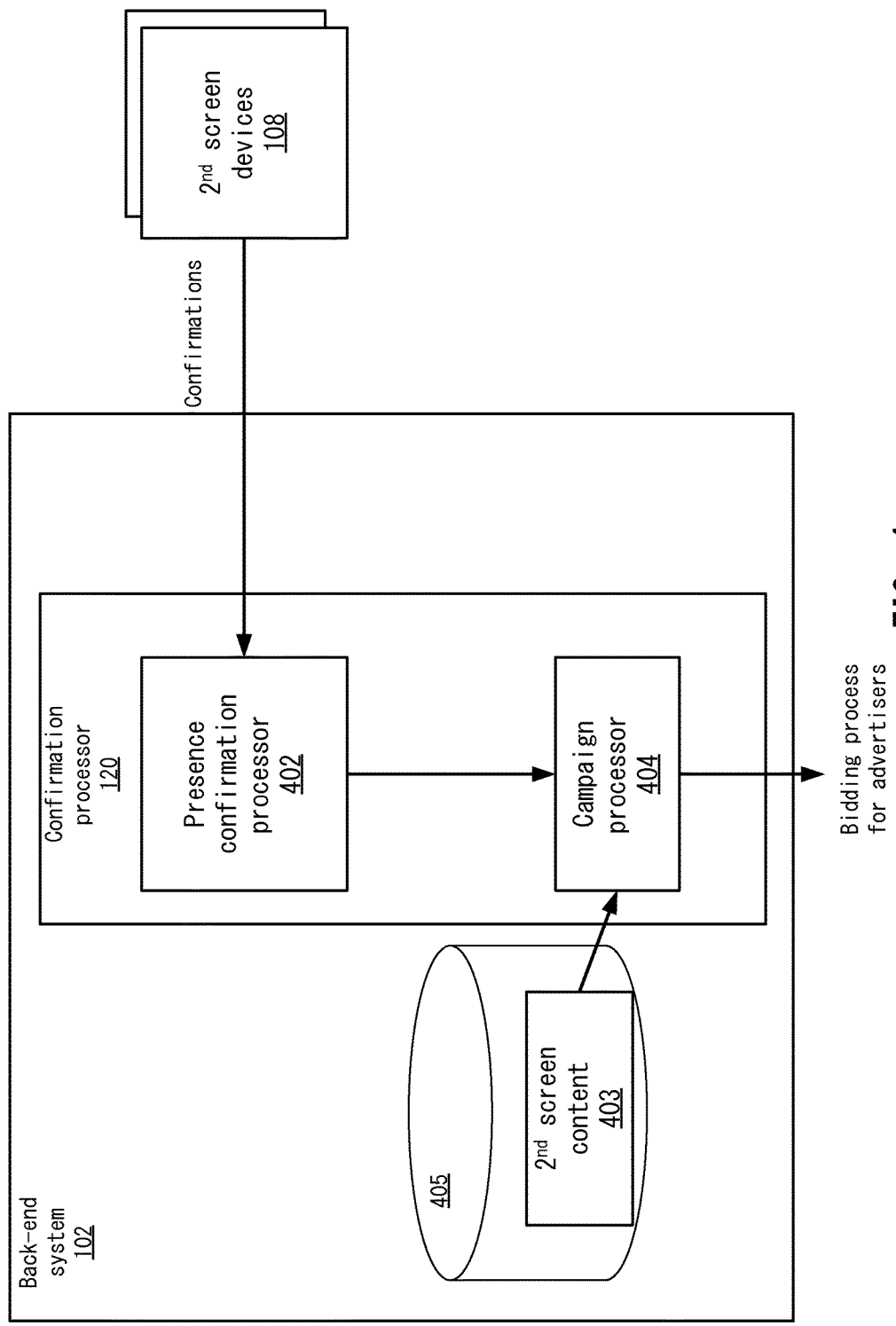
FIG. 4 depicts a more detailed example of a confirmation processor according to one embodiment.

Back-end system 102 may use the confirmation of presence in different ways. FIG. 4 depicts a more detailed example of confirmation processor 120 according to one embodiment. In one embodiment, back-end system 102 may be combined with a campaign management system that can present certain kinds of confirmations of trigger events to outside entities, such as advertisers. These confirmations of trigger events can then be associated with second-screen content that is designed for second-screen devices 108. Other actions may also be provided, such as dynamic bidding for advertisements based on the confirmed presence of second-screen device 108. Further, aggregation of presence confirmation may also be used for multiple clients to set a price to provide an ad for a particular presence confirmation of the trigger event.

In confirmation processor 120, a presence confirmation processor 402 may receive the presence confirmation from second-screen device 108. Additionally, presence confirmation processor 402 may be configured to receive multiple confirmations from different second-screen devices 108, such as from second-screen devices 108 from other users or households. Presence confirmation processor 402 may collate the confirmations, such as determining how many presence confirmations are received for a specific piece of content being displayed on first-screen devices 106. The collation may be performed based on time, by content, or by other means. In one example, when a television show is broadcast during a set timeslot, presence confirmation processor 402 collates how many presence confirmations of second-screen devices are received for a trigger event in the show.

Presence confirmation processor 402 may be integrated with campaign processor 404 to determine an action to perform. In one example, campaign processor 404 may use the presence confirmation to determine an action to perform for an ad campaign. For example, the action may involve determining second-screen content 403 from storage 405 based on the presence confirmation and sending it to second-screen device 108 (or another device).

Other actions may also be performed. For example, depending on the number of presence confirmations from multiple second-screen devices 108 after the trigger event is sent, campaign processor 404 may enable other applications if the number of presence confirmations is over a threshold. For example, bidding for an advertisement on the second-screen devices 108 that have confirmed presence may be initiated. Depending on the number of presence confirmations, the bidding may be dynamically adjusted based on a cost model, such as if a large number of presence confirmations is received, the price for an advertisement may be increased. The cost model may also take into account the number of presence confirmations from second-screen devices 108 to set the price for the trigger event and advertisement. Also, the latency of the responses may be used. Latency can be used as a measure of response to each second-screen device 108, so it could be used as an individual modifier when sending out content to a second-screen device 108. This could be aggregated for efficiency as well—if a particular household is (on average) +X seconds faster (or slower) during the confirmation step, then that information can be potentially be used for delivery of second screen content. For example, some second screen content may be dependent on the latency, and excessive latency may make providing the second screen content not desirable or feasible.

In another example, the fingerprinting process on back-end system 102 may be performed earlier than a targeted time, such as the fingerprinting may be performed before content delivery system 110 delivers a certain piece of content during its scheduled broadcast. Then, the trigger event may be sent to second-screen device 108 to detect whether the upcoming content is being output by first-screen device 106. Once confirmed, then an advertisement may be automatically provided to second-screen device 108. In other embodiments, once a presence confirmation is detected, campaign processor 404 may detect upcoming content in the content being delivered and provide second-screen content based on the upcoming content. However, in this case, presence confirmation may need to be continually performed to make sure that a user does not leave the room or the location or stop watching the content.

Method Flows

Figure 5:
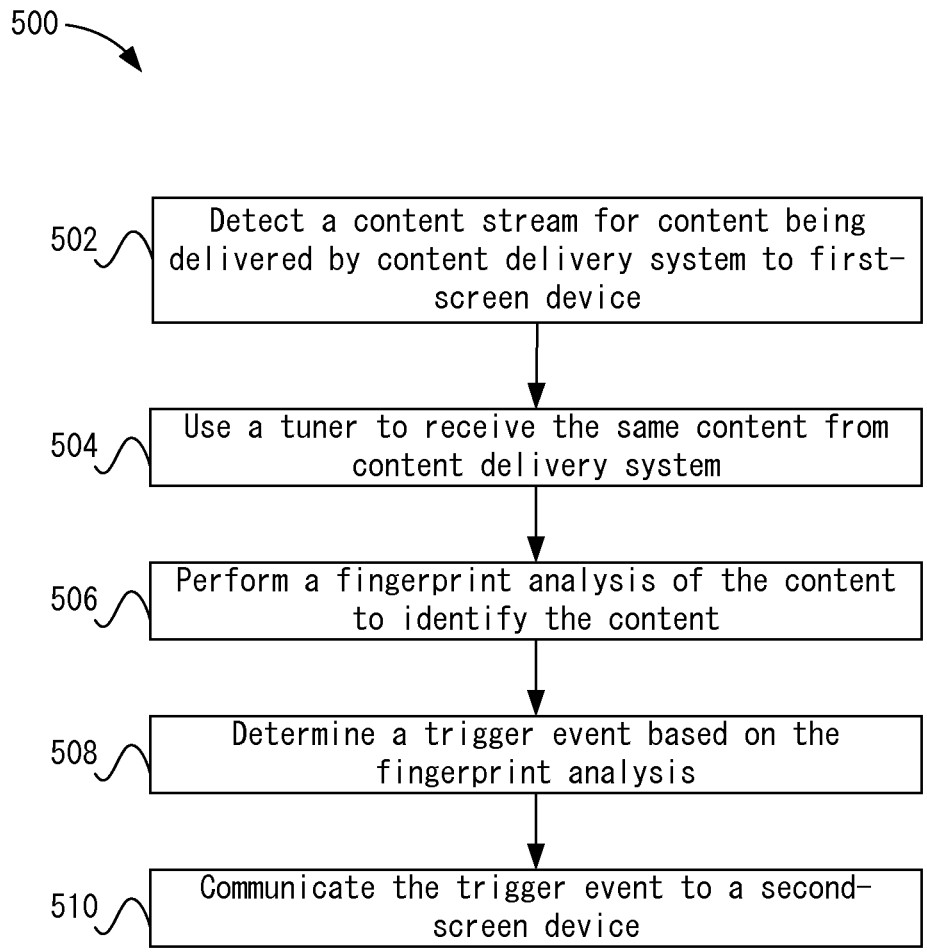
FIG. 5 depicts a simplified flowchart of a method for confirming presence according to one embodiment.

FIG. 5 depicts a simplified flowchart 500 of a method for confirming presence according to one embodiment. At 502, back-end system 102 detects a content stream for content being delivered by content delivery system 110 to first-screen device 106. Then, at 504, back-end system 102 uses a tuner to receive the same content from content delivery system 110. Then, at 506, back-end system 102 performs a fingerprint analysis of the content to identify the content.

At 508, back-end system 102 determines a trigger event based on the fingerprint analysis. The fingerprint may match a stored fingerprint in FP index 116.

Once the trigger event is determined, back-end system 102 communicates the trigger event or determines a second-screen device 108 to which to send the trigger event. For example, second-screen devices 108 being used in the same location as first-screen device 106 may be determined. At 510, back-end system 102 may communicate the trigger event to a second-screen device 108. The trigger event causes the second-screen device 108 to perform a presence detection process using hardware of second-screen device 108 to confirm the presence with regard to first-screen device 106.

Figure 6:
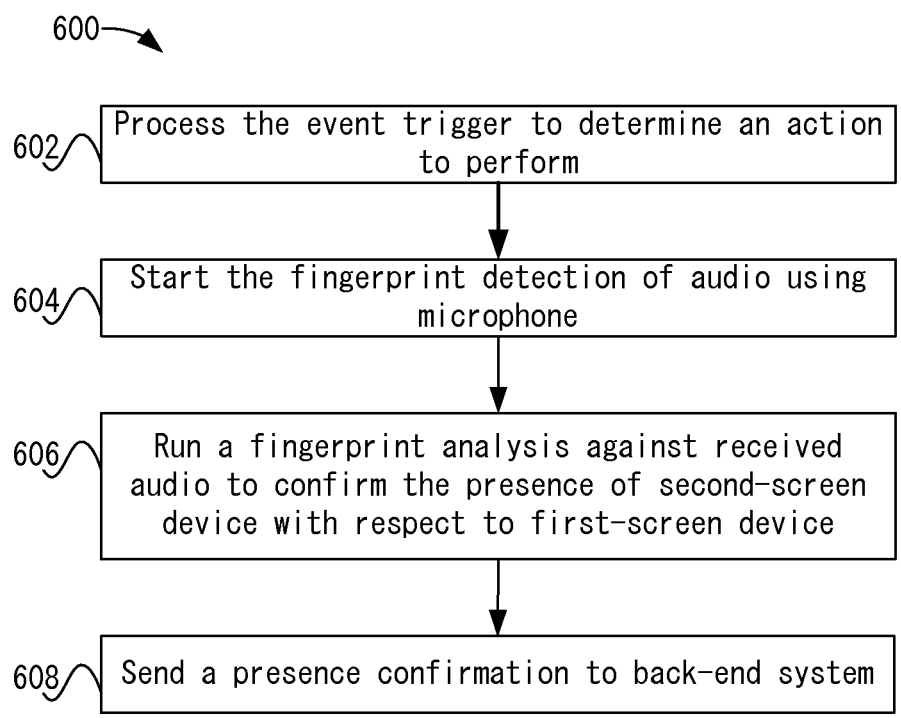
FIG. 6 depicts a simplified flowchart of a method for confirming presence at a second-screen device according to one embodiment.

FIG. 6 depicts a simplified flowchart 600 of a method for confirming presence at second-screen device 108 according to one embodiment. At 602, second-screen device 108 processes the trigger event to determine an action to perform. In one embodiment, the action to perform is to confirm the presence of second-screen device 108 at a location.

In this case, at 604, second-screen device 108 starts the fingerprint detection of audio using microphone 126. In this case, the fingerprint detection was not previously running.

At 606, second-screen device 108 runs a fingerprint analysis against received audio to confirm the presence of second-screen device 108 with respect to first-screen device 106. Assuming that second-screen device 108 is in the same location as first-screen device 106, at 608, second-screen device 108 sends a presence confirmation to back-end system 102. Accordingly, second-screen device 108 only performs the presence confirmation upon receiving a trigger event from back-end system 102. The presence confirmation confirms the presence of second-screen device 108 in a same location as first-screen device 106. For example, second-screen device 108 would need to be within a microphone range of first-screen device 106.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method for confirming presence of a second-screen device with regard to a first-screen device, the method comprising:
    receiving a content, by a back-end computer system comprising one or more servers coupled to a content delivery network of a content delivery system, from a server of a tuner server farm, the tuner server farm comprising a plurality of tuner servers coupled to the content delivery network,
    wherein each tuner server comprises a plurality of channel tuners, each channel tuner able to tune to a selected channel of a plurality of different channels of the content delivery system,
    wherein the received content is being delivered by the content delivery system via the content delivery network to a first-screen device,
    wherein the back-end computer system is at a remote physical location separate from both the first-screen device and the second-screen device, and further wherein the plurality of tuner servers are each at a different physical location from either the first-screen device or the second-screen device, and
    wherein the first-screen device is associated with a user account;
    performing, by the back-end computer system, a content detection analysis of the content;
    determining, by the back-end computer system, a trigger event based on the content detection analysis, the trigger event being triggered based on a portion of the content, wherein multiple fingerprints are generated from multiple portions of the content and the trigger event is generated in response to comparing the multiple fingerprints to a fingerprint index and when a match between a first fingerprint in the multiple fingerprints and a second fingerprint in the fingerprint index occurs;
    selecting, by the back-end computer system, a second-screen device associated with a user account entity, wherein the user account entity is associated with the user account of the first-screen device; and
    communicating, by the back-end computer system, the trigger event to the selected second-screen device via a second network, the trigger event causing the second-screen device to start a presence detection analysis using hardware of the second-screen device to confirm the second-screen device's presence with regard to the first-screen device.

2. The method of claim 1, wherein receiving the content comprises:
    tuning, by the back-end computer system, to a channel that is being used to send content to the first-screen device to receive the content from the content delivery network.

3. The method of claim 1, wherein receiving the content comprises:
    using the tuner server farm to tune to a selected plurality of different channels provided by the content delivery system to receive content from each of the selected plurality of different channels.

4. The method of claim 1, wherein receiving the content comprises receiving a control signal from the first-screen device indicating the content being requested and using the control signal to request the content from the content delivery network.

5. The method of claim 1, wherein the back-end computer system is integrated with the content delivery system.

6. The method of claim 1, wherein performing the content detection analysis of the content comprises:
    performing a fingerprint analysis of multiple portions of a characteristic of the content.

7. The method of claim 6, wherein the characteristic of the content comprises audio and/or video.

8. The method of claim 1, wherein the user comprises a first user, and wherein selecting the second-screen device comprises:
    determining a set of second users and the first user that are associated with the first-screen device, wherein the set of second users and the first user are associated with different second-screen devices; and
    selecting the first user from the set of second users and the first user.

9. The method of claim 8, further comprising:
    sending the trigger event to the different second-screen devices for the set of second users and the first user, the trigger event causing the different second-screen devices to start the presence detection analysis using hardware of the different second-screen devices to confirm the different second-screen device's presence with regard to the first-screen device.

10. The method of claim 1, further comprising:
    receiving a presence confirmation from the second-screen device, wherein the presence confirmation indicates the second-screen device is in a same location as the first-screen device; and
    performing an action based on receiving the presence confirmation.

11. The method of claim 10, wherein the action comprises:

determining second-screen content to send to the second-screen device based on the presence confirmation; and
sending the second-screen content to the second-screen device in coordination with the first-screen content being output on the first-screen device.

12. The method of claim 10, wherein the action comprises:
using the presence confirmation to initiate an application that uses the presence confirmation to perform the action.

13. The method of claim 12, wherein the application adjusts a bidding price for sending the second-screen content based on the presence confirmation.

14. The method of claim 13, further comprising:
collating multiple presence confirmations for the first-screen content, the multiple presence confirmations received from multiple second-screen devices; and
using the collated multiple presence confirmations to adjust the bidding price.

15. A method for confirming presence of a second-screen device with regard to a first-screen device, the method comprising:
receiving, by the second-screen device via a second network, a trigger event from a back-end system comprising one or more computer servers coupled to a content delivery network of a content delivery system;
the back-end system receiving a content from a server of a tuner server farm, the tuner server farm comprising a plurality of tuner servers coupled to the content delivery network,
wherein each tuner server comprises a plurality of channel tuners, each channel tuner able to tune to a selected channel of a plurality of different channels of the content delivery system,
wherein the received content is being delivered by the content delivery system to the first-screen device, and
wherein the back-end system is at a remote physical location separate from both the first-screen device and the second-screen device, and further wherein the plurality of tuner servers are each at a different physical location from either the first-screen device or the second-screen device;
the back-end system performing a first content detection analysis of the content to determine the trigger event, wherein multiple fingerprints are generated from multiple portions of the content and the trigger event is generated in response to comparing the multiple fingerprints to a fingerprint index and when a match between a first fingerprint in the multiple fingerprints and a second fingerprint in the fingerprint index occurs;
based on receiving the trigger event, initiating, by the second-screen device, access of a hardware element to detect information within a range of the second-screen device;
determining, by the second-screen device, whether the second-screen device is in a same location as the first-screen device using a second content detection analysis of the information detected by the hardware element; and
sending, by the second-screen device, a presence confirmation that the second-screen device is in the same location of the first-screen device when the second content detection analysis detects the content from the content delivery system is being output by the first-screen device.

16. The method of claim 15, further comprising:
receiving a communication of an action to perform on the second-screen device upon determining the presence confirmation.

17. The method of claim 15, wherein the trigger event is received at an operating system layer and the hardware element is accessed through the operating system layer.

18. The method of claim 15, wherein initiating access comprises accessing a microphone of the second-screen device to detect audio in the range.

19. A system comprising:
a first-screen device configured to request delivery of content from a content delivery system via a content delivery network;
a second-screen device associated with a user of the first-screen device; and
a back-end system integrated with the content delivery system, the back-end system comprising one or more computers at a physical location remote from both the first-screen device and the second-screen device, the one or more computers configured to perform:
receiving the content from a server of a tuner server farm, the tuner server farm comprising a plurality of tuner servers coupled to the content delivery network, wherein the plurality of tuner servers are each at a different physical location from either the first-screen device or the second-screen device, wherein each tuner server comprises a plurality of channel tuners, each channel tuner able to tune to a selected channel of a plurality of different channels of the content delivery system, and wherein the received content is being delivered by the content delivery system via the content delivery network to the first-screen device;
performing a content detection analysis of the content;
determining a trigger event based on the content detection analysis, the trigger event being triggered based on detecting the trigger event in a portion of the content, wherein multiple fingerprints are generated from multiple portions of the content and the trigger event is generated in response to comparing the multiple fingerprints to a fingerprint index and when a match between a first fingerprint in the multiple fingerprints and a second fingerprint in the fingerprint index occurs; and
communicating the trigger event, via a second network, to the second-screen device for the user, the trigger event causing the second-screen device to start a presence detection analysis using hardware of the second-screen device to confirm the second-screen device's presence with regard to the first-screen device.

* * * * *